United States Patent [19]

Mizusawa

[11] 4,403,377
[45] Sep. 13, 1983

[54] FASTENING DEVICE

[75] Inventor: Akira Mizusawa, Fujisawa, Japan

[73] Assignee: Nifco Inc., Tokyo, Japan

[21] Appl. No.: 216,100

[22] Filed: Dec. 15, 1980

[30] Foreign Application Priority Data

Dec. 18, 1979 [JP] Japan ............................ 54-174290[U]

[51] Int. Cl.³ ............................................. F16B 13/06
[52] U.S. Cl. .................................... 24/217 R; 24/297;
411/15
[58] Field of Search ........................ 411/15, 39, 40, 41,
411/44, 45, 46, 48, 57, 78; 24/217 R, 214, 293,
297, 208 A

[56] References Cited

U.S. PATENT DOCUMENTS

| 1,229,562 | 6/1917 | Willetts | 24/217 R |
| 3,918,130 | 11/1975 | Poe | 24/297 |
| 4,114,509 | 9/1978 | Poe | 24/214 |
| 4,122,583 | 10/1978 | Grittner et al. | 24/297 |
| 4,312,614 | 1/1982 | Palmer et al. | 24/297 |

FOREIGN PATENT DOCUMENTS 197808 8/1978 United Kingdom .................. 411/15

Primary Examiner—Robert A. Hafer
Attorney, Agent, or Firm—Thomas W. Buckman; Jack R. Halvorsen

[57] ABSTRACT

A fastening device comprises a fastening base and a wedge member and is capable of ensuring fast engagement of an engaging leg with a panel by inserting the engaging leg in a hole formed in the panel and driving the wedge member into an insertion hole formed inside the engaging leg thereby expanding the engaging leg inside the hole of the panel and is also capable of readily releasing the engaging leg from the fast engagement with the panel by pulling out the driven wedge member.

10 Claims, 7 Drawing Figures

FASTENING DEVICE

BACKGROUND OF THE INVENTION

This invention relates to a fastening device so constructed that an attaching base thereof is fastened to a given panel by inserting an engaging leg provided on the attaching base into a hole perforated in the panel and pushing a wedge member into an insertion hole formed within the engaging leg along the axis thereby causing the inserted wedge member to expand the engaging leg within the perforated hole of the panel and fasten it to the panel, and more particularly to the improvement in the fastening device, which improvement comprises adapting the wedge member so that after the wedge member has been pushed into the aforementioned insertion hole, it will be freely drawn out of the panel whenever necessity arises and, as a result, the attaching base which has been fastened to the panel will be freely and easily released from the panel.

Heretofore, as a measure for attaching plastic parts to electric appliances and automobiles, there have been frequently adopted methods of a common principle that required fastening of parts to their substrates is accomplished by preparatorily providing such parts with engaging legs, forming matching holes in the pertinent metal panels of the substrates and inserting the engaging legs into the perforated holes.

Methods capable of providing required fastening by the insertion of engaging legs have been proposed in a wide variety and have found utility in practical applications. Of the devices used in these methods, those which permit the parts already fastened to their substrates to be released from the attachment at will are broadly divided into two types, i.e. devices of one type which provide required attachment by simply inserting the engaging legs into the perforated holes in the substrates and devices of the other type which attain required fastening by first inserting the engaging legs into the perforated holes and thereafter driving wedge members into the engaging legs thereby expanding the engaging legs within the perforated holes.

Generally the devices of the former type are so constructed that the engaging legs having outside diameters greater than the diameters of the relevant perforated holes in the panels, during entry into the perforated holes, are allowed to contract radially by virtue of the resiliency conferred upon the legs and, after completion of engagement with the holes, the engaging legs are allowed to regain their original shapes and come into tight contact with the perforated holes. In some of these devices, the engaging legs are split into several pieces to permit ample contraction of their outside diameters. In some other of these devices, the engaging legs have hollow interiors to permit such radial contraction. Since the devices of this type are so constructed that the engaging legs thereof are attached to the perforated holes by virtue of the resilient repulsive force produced by the engaging legs themselves, the attached legs may possibly be easily removed from the holes by a pull given at strength surpassing the engaging strength. There is also a possibility that fatigue of material builds up in the engaging legs to a point where the engaging strength is weakened and the attached legs are consequently allowed to come off easily from the holes. These devices, therefore, are unfit for applications involving use of heavy parts and applications destined to expose parts to continual vibrations, though they may fit applications involving use of small parts.

In contrast, the devices of the latter type are constructed so that secure attachment of engaging legs to perforated holes is obtained by first inserting the engaging legs into the perforated holes and thereafter driving wedge members into the engaging legs thereby expanding the engaging legs within the perforated holes. The attached engaging legs will not come off the perforated holes unless the wedge members are loosed out of position. They are, therefore, suitable for applications involving use of heavy parts and applications destined to expose the parts to continual vibrations. Since the devices of the conventional principle ensuring fast engagement by use of wedge members emphasize retention of engaging legs in their securely engaged condition, they are not provided with means for aiding in release of the inserted wedge members. Generally, required release of the inserted engaging legs from the perforated holes is obtained by prying loose or totally breaking the wedge members such as with a screw driver. Particularly in the case of devices so constructed that wedge members are provided at their leading ends with radially expanded portions with a view to ensuring perfect engagement and the radially expanded portions are brought into fast engagement with the leading ends of the engaging legs which have been forced through the perforated holes and subsequently allowed to regain their original expanded form, required removal of wedge members is substantially impracticable and the release of the fastening bases from the panels is not obtained.

SUMMARY OF THE INVENTION

A principal object of this invention is to provide an improvement in the fastening device designed to ensure fast engagement of an engaging leg with a panel by inserting the engaging leg into the perforated hole of the panel and driving the wedge member into the insertion hole formed inside the engaging leg thereby expanding the engaging leg inside the perforated hole, which improvement comprises adapting the device thereby enabling the driven wedge member to be easily pulled out and the engaging leg to be consequently released from the fast engagement with the panel.

To accomplish the object described above according to the present invention, there is provided a fastening device which comprises a fastening base provided with an engaging leg vertically extended downwardly from the lower surface thereof and adapted to be inserted fast into a perforated hole formed in a panel, with an insertion hole bored vertically along the axis of the engaging leg downwardly from the upper surface thereof, and with protuberances raised from the upper surface thereof around the opening into the insertion hole; and a wedge member provided with a shank portion adapted for insertion into the insertion hole, with a flange-shaped head portion formed at the upper end of the shank portion, and with protuberances formed on the lower surface of the head portion and matched to the protuberances formed on the fastening base.

Other objects and characteristic features of this invention will become apparent from the disclosure of the invention to be given hereinafter in detail with reference to the accompanying drawing.

DESCRIPTION OF PREFERRED EMBODIMENT

Illustrated is a typical embodiment wherein the present invention is utilized for fastening an inner handle cover for an automobile door molded of a plastic material to an inner panel. The handle cover shown here corresponds to the attaching base and the inner panel to the panel, respectively contemplated by the present invention.

Figure 1:
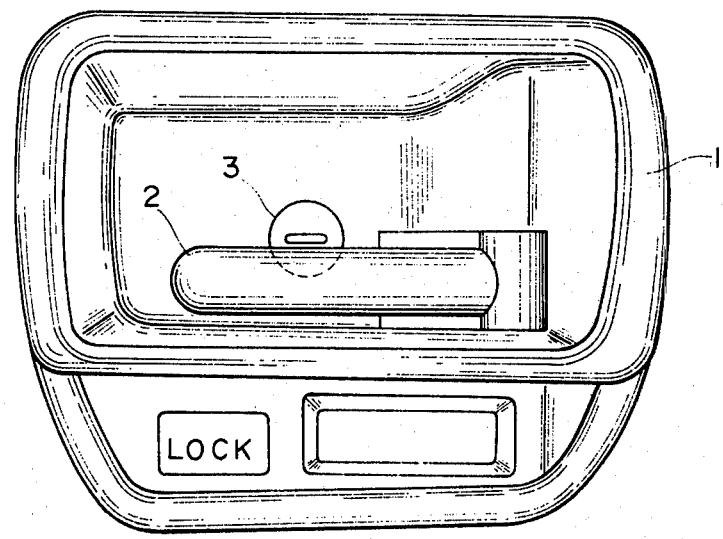
FIG. 1 is a plan view illustrating the fastening device of this invention in its working condition.

FIG. 1 is a plan view showing the aforementioned handle cover 1 in its fastened condition. In the diagram, 2 denotes an inner handle having the bearing portion thereof covered with the handle cover and 3 a wedge member inserted to fasten the handle cover to the panel 4.

Figure 2:
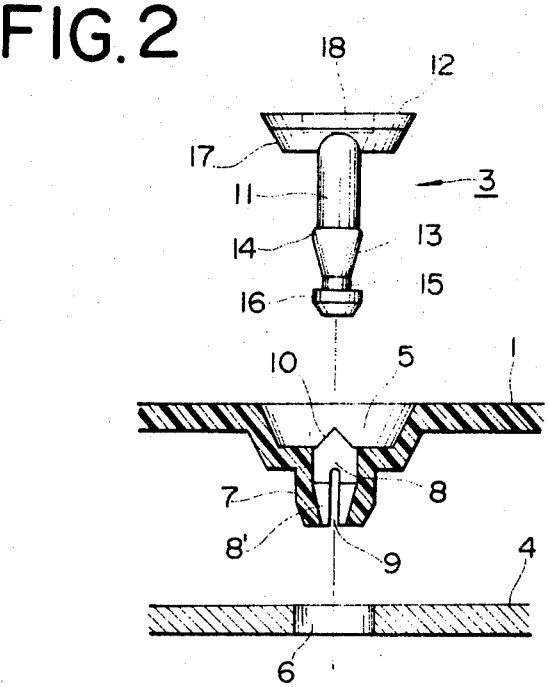
FIG. 2 is a partially sectioned, enlarged and exploded front view of the essential part of the fastening device.
Figure 3:
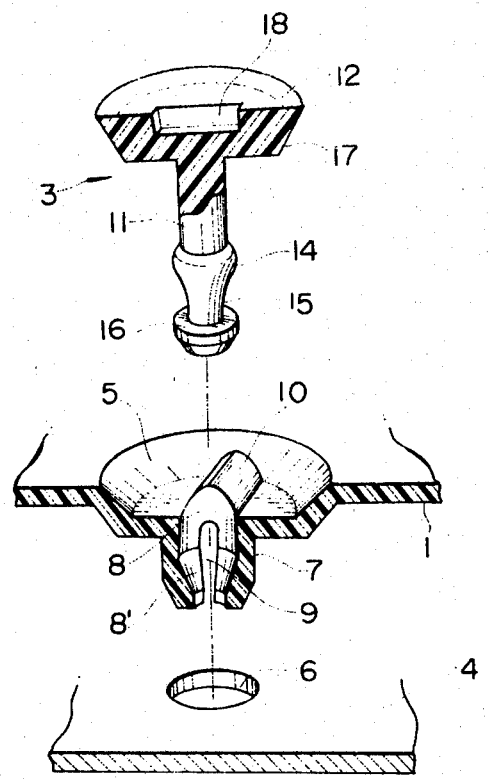
FIG. 3 is a perspective view of the fastening device of FIG. 2.
Figure 4:
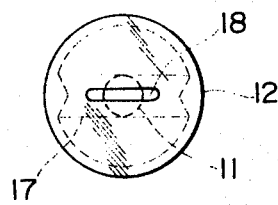
FIG. 4 is a plan view of the wedge member of the fastening device.
Figure 5:
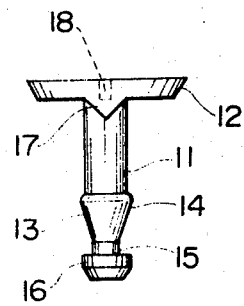
FIG. 5 is a side view of the wedge member.

FIG. 2 is an enlarged, partially sectioned exploded front view of the essential part of the device of this invention for fastening the handle cover 1, namely fastening base 1, to the panel 4, and FIG. 3 is a perspective view of FIG. 2. As illustrated in detail in these diagrams, the aforementioned fastening base 1 is formed in the shape of a plate having a required thickness. By denting a part of this fastening base 1 in the shape of a truncated cone, a recess 5 is produced. From the lower surface of the bottom of this recess 5, an engaging leg 7 adapted to engage with a perforated hole 6 formed in a panel 4 is integrally and perpendicularly extended downwardly.

In the axial portion of the engaging leg 7, an insertion hole 8 is perforated in the shape of a cylinder from the upper surface of the bottom of the recess 5 to the leading end of the leg. This engaging leg 7 is divided into two opposed parts by a groove 9 vertically inserted up the leg from the end of the leg. Owing to the formation of this groove 9, the engaging leg is rendered radially expansible. The diameter of the aforementioned insertion hole 8 begins to decrease gradually downwardly halfway in the entire height of the hole to form a tapered surface 8'. The outer diameter of the leg terminal is proportionally decreased to facilitate insertion of the engaging leg into the perforated hole 6 in the aforementioned panel 4. Further on the upper surface of the aforementioned bottom of the recess 5, protuberances 10 having a cross section of isosceles triangle are formed around the opening of the insertion hole 8, with the corner lines of the protuberances radiating from the axis of the hole.

On the other hand, a wedge member 3 comprises a shank portion 11 for insertion into the aforementioned insertion hole 8 and a flange-shaped head portion 12 formed on the top of the shank portion. Halfway in the entire length of the shank portion, there is provided a radially expanded portion 14 which continued to a tapered surface 13 having the outside diameter decreasing gradually downwardly toward the leading end. Further at the leading end of the tapered surface, an enlarged portion 16 substantially equalling in outside diameter to the radially expanded portion 14 is disposed through the medium of a radially contracted portion 15. In the lower surface of the head portion 12, protuberances 17 having a cross section of an isosceles triangle similar to the protuberances 10 formed on the fastening base 1 side are provided.

The length of the shank portion 11 of the wedge member 3 to the radially expanded portion 14 is equalized with the length from the apexes of the protuberances 10 to the tip end of the engaging leg 7. The shank portion is given an outside diameter slightly smaller than the inside diameter of the insertion hole 8 at the major diameter portion thereof, and the radially expanded portion 14 is given a diameter substantially equal to the inside diameter of the insertion hole 8 at the major diameter portion thereof. The radially contracted portion 15 is given a diameter smaller than the outside diameter of the aforementioned shank portion and substantially equal to the inside diameter of the leading end of the gradually converging insertion hole. The head portion 12 is formed in the shape of a circular disk so as to fit the recess 5 formed in the aforementioned fastening base 1. The peripheral edge of the head portion is slanted inwardly in the downward direction and the protuberances 17 formed on the lower surface thereof are formed so as not to protrude from the slanted peripheral edge. At the center in the upper surface of the head portion 12, there is provided a grooved dent 18 adapted to receive the tip of a screw driver to be used for rotating the wedge member at the time that the wedge portion is desired to be removed as described more fully afterward.

As mentioned previously, the fastening base 1 is a handle cover in the illustrated embodiment. When this handle cover is molded of a plastic material, the engaging leg 7, the insertion hole 8 and the projections 10 are formed integrally with the recess 5. Similarly to the fastening base, the wedge member 3 is integrally molded of a plastic material, though separately of the fastening base.

In the present embodiment, before the fastening base 1 is attached to the panel 4, the fastening base 1 and the wedge member 3 which have been molded as described above are coupled with each other by having the shank portion 11 of the wedge member 3 inserted in the insertion hole 8 of the fastening base 1. In the coupled state, they are attached to the panel.

Figure 6:
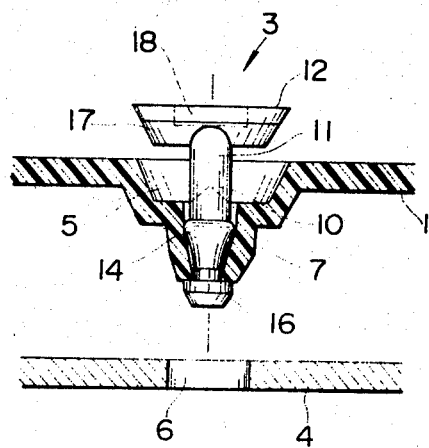
FIG. 6 is a partially sectioned front view of the wedge member in a state coupled with the insertion hole.
Figure 7:
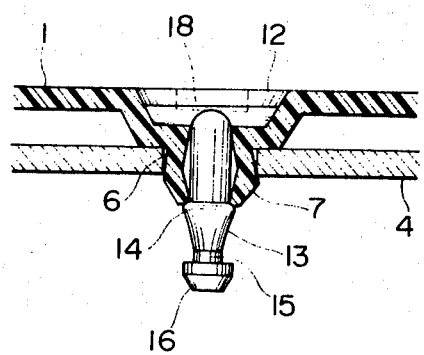
FIG. 7 is a partially sectioned front view of the fastening device in a state attached fast to the panel.

FIG. 6 and FIG. 7 illustrate the relationship just mentioned. The fastening base 1 and the wedge member 3 which are held in an exploded state as shown in FIG. 2 and FIG. 3 are coupled with each other by causing the shank portion 11 of the wedge member to be inserted into the insertion hole 8. In this case, the forced insertion of the wedge member in the insertion hole 8 is stopped after the enlarged portion 16 at the leading end of the shank portion 11 has been thrust past the leading end of the engaging leg 7, so that the portion of the smallest diameter in the entire length of the insertion holes 8 will assume its position at the radially contracted portion 15 of the shank portion 11 and the leg which has been expanded radially during the passage of the enlarged portion 16 will resume its original outside diameter (FIG. 6). Of course, in this state, the enlarged portion 16 of the shank portion 11 is thrust past the insertion hole and the jaw of the enlarged portion comes into contact with the edge of the engaging leg. The coupled state thus obtained is retained intact unless the engaging leg is forcibly opened radially enough for the wedge member to slip off the fastening base.

Subsequently, with the two members in a coupled state formed as described above, the engaging leg 7 having the aforementioned shank portion 11 pierced therethrough is forced into the perforated hole 6 of the panel and, after the lower surface of the recess 5 has collided with the upper surface of the panel, the head portion 12 of the wedge member 3 is pushed down and the shank portion 11 is driven in completely. Consequently, the radially expanded portion 14 which has so far been positioned in the major diameter portion of the insertion hole is caused to force its way through the tapered surface 8' and thrust itself out of the tip of the leg and the shank portion 11 having a diameter greater than the inside diameter of the minor diameter portion at the leading end part of the insertion hole causes the minor diameter portion to be radially expanded, with the result that the engaging leg comes into fast attachment within the perforated hole 6 and the fastening base fastened securely to the panel (FIG. 7). In this case, the aforementioned depression of the head portion 12 is carried out while the protuberances 17 formed on the lower surface thereof are staggered from the protuberances 10 formed on the upper surface of the bottom of the recess 5, so that the head portion 12 is wholly received inside the recess. In consequence of this depression, the apexes of the protuberances 10 collide with the lower surface of the head portion and the apexes of the protuberances 17 collide with the bottom of the recess.

The fastening base which has been brought into fast engagement with the panel in consequence of the forced insertion of the wedge member 3 is securely retained in its fastened state owing to the radial expansion of the engaging leg 7. When removal of the fastening base from the panel is required as when the automobile portion incorporating the inner handle covered with the handle cover stands in need of maintenance, a suitable tool such as a screw driver is set in position within the grooved dent 18 formed in the upper surface of the head portion 12 as described above and the tool is rotated round its axis. In consequence of the rotation imparted to the wedge member, the protuberances 17 formed on the lower surface of the head portion and the protuberances 10 on the bottom of the recess 5 collide with each other and their slanted surfaces rub each other, causing the protuberances 17 to slide upwardly and the wedge member as a whole to rise. Because of this ascent of the wedge member, the radially expanded portion 14 of the shank portion 11 which has been protruding from the leading end of the engaging leg 7 again forces its way through the end of the engaging leg into the insertion hole 8 and then assume the position of the radially contracted portion 15 in the leading end part of the insertion hole 8 where the inside diameter is smallest. Thus, the engaging leg 7 which has so far been kept in a radially expanded state resumes its original form shown in FIG. 6 and relieves itself from the fast engagement with the perforated hole in the panel and the fastening base can be easily removed from the panel.

As described above, the device of this invention fulfills its function as a fastener by enabling the engaging leg 7 inserted preparatorily in the perforated hole of the panel to be expanded radially, similarly to the conventional fastening devices of this type, by the forced insertion of a wedge member 3. On the other hand, unlike those conventional fastening devices, this device enables the shank portion 11 already forced into the insertion hole to be pulled up by the rotation of the wedge member 3 and consequently released from the radially expanded state. Thus, the device permits easy removal of the fastening base from the panel.

The embodiment so far described represents a case wherein a radially expanded portion 14, an intervening radially contracted portion 15 and an enlarged portion 16 are provided in the order mentioned at the leading end of the shank portion 11 of the wedge member 3. The components thus provided in the wedge member 3 are intended means for permitting preparatory coupling of the wedge member with the insertion hole 8 and further for precluding ready accidental separation of the inserted shank portion. Optionally, therefore, the present invention may be embodied by forming the shank portion 11 simply in the shape of a rod free from expanded or contracted portions, so far as the forced insertion of the rod-shaped shank portion provides desired radial expansion of the engaging leg.

In the foregoing embodiment, the protuberances 10 and 17 are both so formed as to assume a cross section of the shape of an isosceles triangle. It is permissible for one of the two sets of the protuberances to be formed in any simple shape. Otherwise, this invention may be embodied by imparting to the upper surface of the fastening base a required protuberance in the form of a cam surface containing a raised portion in a partially or wholly inclined surface and, at the same time, imparting to the lower surface of the head portion of the wedge member a substantial protuberance in the form of a cam surface correspondingly to the cam-shaped protuberance on the fastening base. In short, the two sets of protuberances 10, 17 fulfill their function insofar as they are correlated to each other so that when the shank portion 11 of the wedge member 3 is rotated about its axis, they collide sideway into each other and their lateral surfaces rub each other until the wedge member is lifted out of its position. Thus, the protuberances need not be limited to any fixed shape. The protuberances 10, 17 shown in the preceding embodiment are merely one of the most desirable examples of such protuberances.

The embodiment described above represents a case wherein a recess 5 is formed particularly in the fastening base 1 for admitting the head portion 12 of the wedge member 3. This arrangement contemplates giving a flat continuous surface to the fastening base and precluding accidental extraction of the inserted wedge member, and such an arrangement is generally adopted in conventional fastening devices of this type. In the working of the present invention, therefore, this recess may be omitted as occasion demands. Nevertheless, the present invention fully manifests its effect and suits the actual state of affairs when the head portion of the wedge member comes to lie flush with the surface of the fastening base so as to render difficult any attempt to take a grip on the head portion, give it a pull and remove the shank portion 11 from the insertion hole 8. From this point of view, the embodiment may well be called an ideal example of the present invention.

Although in the illustrated embodiment, the invention is applied to the fastening of an inner handle cover, it can be naturally embodied as fastening devices made of various types of plastic materials. In the illustrated embodiment, the engaging leg, the insertion hole and the protuberances are integrally molded in conjunction with the molding of the specific handle cover. Optionally, this invention may be embodied by forming the fastening base in the shape of a circular flange as frequently observed in ordinary fasteners, or by forming the fastening base in the shape of a simple plate, providing this fastening base with an engaging leg, an insertion hole formed through the axis of the engaging leg and protuberances, and joining the fully furnished fastening base to a specific substrate part such as with an adhesive agent. This alternate embodiment proves particularly advantageous when the specific substrate part is made of material other than a plastic material, such as a metal material or when the substrate part is so large that the integral molding of the aforementioned engaging leg and so forth with the substrate part is unsuitable or difficult.

What is claimed is:

1. A fastening device comprising a fastening base and a wedge member, said fastening base being provided with a radially expendable engaging leg vertically extended downwardly from the lower surface of said fastening base and adapted to be inserted into a perforated hole in a panel and with an axially converging insertion hole extending vertically along the axis of said engaging leg downwardly from the upper surface thereof to a reduced neck portion at the entering end of said leg, and said wedge member being provided with a shank portion adapted for pre-assembled insertion into said insertion hole and with a flange-shaped head portion formed at the upper end of said shank portion, whereby the fastening of said fastening base to the panel is accomplished by inserting said engaging leg into the perforated hole of the panel and then forcing said shank portion of said wedge member by further advancement into said insertion hole thereby causing said engaging leg to be initially radially expanded within the perforated hole, said wedge member shank portion further comprising an enlarged diameter leading end portion opposite to said head portion and followed by a first shank portion of reduced diameter substantially no greater than the smallest unexpanded diameter defined by said axially converging insertion hole neck portion for normally retaining said wedge member pre-assembled and non-removably engaged with and partially axially advanced with respect to said fastening base with said engaging leg in a non-expanded condition, said neck portion embracing said first shank portion with said entering end portion extending beyond said leg entering end as a pilot, and a second enlarged diameter portion following said first shank portion and followed by a second shank portion of diameter greater than said smallest unexpanded diameter of said axially converging insertion hole, said second shank portion contacting and radially expanding said engaging leg within said perforated hole upon further axial advancement of said wedge member.

2. The fastening device according to claim 1, wherein protuberances are formed on the upper surface of said fastening base radiating from the center of the opening into the insertion hole.

3. The fastening device according to claim 2, wherein complementary protuberances are formed on the lower surface of the head portion of said wedge member radiating from the axis of the shank portion.

4. The fastening device according to claim 3, wherein the protuberances formed on the upper surface of said fastening base are in the shape of a cam possessing an inclined surface and formed by partially raising said upper surface and the protuberances formed on the lower surface of the head portion of said wedge member are in the shape of a cam substantially similar to the cam formed on said fastening base.

5. The fastening device according to claim 1 or claim 4, wherein the head portion of said wedge member is provided with a grooved dent for receiving the tip of a tool to be used for imparting a rotation to said wedge member.

6. The fastening device according to claim 3 wherein the respective protuberances of the wedge member and the fastening base define, in cross-section, isosceles triangles.

7. The fastening device according to claim 1 or claim 4 wherein said first enlarged diameter shank portion is provided with an abrupt trailing shoulder and said second enlarged diameter shank portion is provided with a rounded trailing shoulder to facilitate partial axial retraction of said shank for relieving the expansion of said expandable leg while retaining said shank engaged with said fastening base.

8. The fastening device according to claim 7 wherein said second enlarged diameter shank portion further includes a tapered leading surface to facilitate insertion thereof with gradual expansion of said insertion hole in said fastening base.

9. The fastening device according to claim 7 wherein the axial length of said second shank portion is at least as great as the axial length of said insertion hole.

10. The fastening device according to claim 8 wherein said first enlarged diameter portion is provided with a tapered leading edge to facilitate insertion thereof with respect to said insertion hole.

* * * * *